United States Patent
Ghosh et al.

(10) Patent No.: US 7,634,957 B2
(45) Date of Patent: Dec. 22, 2009

(54) METHOD AND APPARATUS FOR MACHINING WORKPIECES HAVING INTERRUPTIONS

(75) Inventors: Ranajit Ghosh, Macungie, PA (US); Zbigniew Zurecki, Macungie, PA (US); Lance Michael Grimm, Bowmanstown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/221,718

(22) Filed: Sep. 9, 2005

(65) Prior Publication Data

US 2006/0053987 A1 Mar. 16, 2006

Related U.S. Application Data

(60) Provisional application No. 60/611,015, filed on Sep. 16, 2004.

(51) Int. Cl.
B23B 27/00 (2006.01)
B23B 1/00 (2006.01)

(52) U.S. Cl. .............................. 82/1.11; 82/900; 82/901

(58) Field of Classification Search .................. 407/11, 407/100, 48, 40, 53, 103, 33, 34, 64; 82/52, 82/901, 50, 1.11, 900
See application file for complete search history.

(56) References Cited

U.S. PATENT DOCUMENTS

| | | | |
|---|---|---|---|
| 2,635,399 A | 4/1953 | West, Jr. | |
| 2,641,047 A | 6/1953 | Jackman et al. | |
| 3,077,802 A | 2/1963 | Philip | |
| 3,433,028 A | 3/1969 | Klee | |
| 3,571,877 A | 3/1971 | Jeffries | |
| 3,650,337 A | 3/1972 | Andrews, et al. | |
| 3,696,627 A | 10/1972 | Longsworth | |
| 3,751,780 A | 8/1973 | Villalobos | |
| 3,889,520 A * | 6/1975 | Stoferle et al. | 73/37.5 |
| 3,900,975 A | 8/1975 | Lightstone et al. | |
| 3,971,114 A | 7/1976 | Dudley | |
| 3,979,981 A | 9/1976 | Lightstone et al. | |
| 4,083,220 A | 4/1978 | Kobayashi et al. | |
| 4,296,610 A | 10/1981 | Davis | |
| 4,336,689 A * | 6/1982 | Davis | 62/50.1 |
| 4,404,827 A | 9/1983 | Van den Sype | |
| 4,510,760 A | 4/1985 | Wieland | |
| 4,547,470 A | 10/1985 | Tanase et al. | |
| 4,666,665 A | 5/1987 | Hornsby et al. | |
| 4,715,187 A * | 12/1987 | Stearns | 62/50.1 |
| 4,716,738 A | 1/1988 | Tatge et al. | |
| 4,788,842 A | 12/1988 | Kopp et al. | |
| 4,829,859 A | 5/1989 | Yankoff | |
| 4,829,869 A | 5/1989 | Katada et al. | |
| 4,844,047 A | 7/1989 | Brehm et al. | |
| 4,848,198 A | 7/1989 | Royal et al. | |
| 5,025,547 A | 6/1991 | Sheu et al. | |
| 5,103,701 A | 4/1992 | Lundin et al. | |
| 5,123,250 A | 6/1992 | Maric | |
| 5,237,894 A * | 8/1993 | Lindeke | 82/1.11 |
| 5,265,505 A | 11/1993 | Frechette | |
| 5,392,608 A | 2/1995 | Lee | |
| 5,432,132 A | 7/1995 | Dasgupta et al. | |
| 5,449,647 A | 9/1995 | Brandt | |
| 5,477,691 A * | 12/1995 | White | 62/50.2 |
| 5,509,335 A | 4/1996 | Emerson | |
| 5,592,863 A | 1/1997 | Jaskowiak et al. | |
| 5,597,272 A | 1/1997 | Moriguchi | |
| 5,716,974 A | 2/1998 | Camaggi et al. | |
| 5,738,281 A | 4/1998 | Zurecki et al. | |
| 5,761,941 A | 6/1998 | Matsui et al. | |
| 5,761,974 A | 6/1998 | Wang et al. | |
| 5,762,381 A | 6/1998 | Vogel et al. | |
| 5,799,553 A | 9/1998 | Billatos | |
| 5,862,833 A | 1/1999 | Perez | |
| 5,878,496 A | 3/1999 | Liu et al. | |
| 5,901,623 A * | 5/1999 | Hong | 82/50 |
| 6,010,283 A | 1/2000 | Henrich et al. | |
| 6,017,172 A | 1/2000 | Ukegawa et al. | |
| 6,053,669 A * | 4/2000 | Lagerberg | 407/11 |
| 6,105,374 A | 8/2000 | Kamody | |

(Continued)

FOREIGN PATENT DOCUMENTS

CN 87102713 4/1988

(Continued)

OTHER PUBLICATIONS

U.S. Appl. No. 09/870,853, filed May 5, 2001, Zurecki, Zbigniew et al.

(Continued)

Primary Examiner—Will Fridie, Jr.
(74) Attorney, Agent, or Firm—Anne B. Kiernan

(57) ABSTRACT

This invention is a method and apparatus for cutting a workpiece which may have interruptions, with a cutting insert having a cutting edge, where the cutting insert is held in a tool holder and is optionally supported by a shim. Coolant, which may contain liquid nitrogen, is introduced through a passageway to a cooling passage located near the cutting edge. The cooling passage may be located either under, behind, or under and behind the cutting edge. Coolant impacts the wall surfaces of the cooling passage near the cutting edge where it is partly evaporated thereby cooling the cutting insert.

11 Claims, 8 Drawing Sheets

U.S. PATENT DOCUMENTS

| | | | |
|---|---|---|---|
| 6,145,322 | A | 11/2000 | Odashima |
| 6,179,692 | B1 | 1/2001 | Hara |
| 6,200,198 | B1 | 3/2001 | Ukai et al. |
| 6,202,525 | B1 | 3/2001 | Hendrickson et al. |
| 6,305,183 | B1 | 10/2001 | Mukai et al. |
| 6,330,818 | B1 | 12/2001 | Jain |
| 6,332,385 | B1 | 12/2001 | Kautto et al. |
| 6,360,577 | B2 | 3/2002 | Austin |
| 6,454,877 | B1 | 9/2002 | Kumar et al. |
| 6,513,336 | B2 | 2/2003 | Zurecki et al. |
| 6,564,682 | B1 | 5/2003 | Zurecki et al. |
| 6,622,570 | B1 | 9/2003 | Prevey, III |
| 6,652,200 | B2 | 11/2003 | Kraemer |
| 6,658,907 | B2 | 12/2003 | Inoue et al. |
| 6,666,061 | B2 | 12/2003 | Heimann |
| 6,675,622 | B2 | 1/2004 | Plicht et al. |
| 6,874,344 | B1 | 4/2005 | Junius et al. |
| 2002/0040905 | A1 | 4/2002 | Groll |
| 2002/0150496 | A1 | 10/2002 | Chandrasekar et al. |
| 2002/0174528 | A1 | 11/2002 | Prevey, III |
| 2002/0189413 | A1 | 12/2002 | Zurecki et al. |
| 2003/0110781 | A1 | 6/2003 | Zurecki et al. |
| 2003/0145694 | A1 | 8/2003 | Zurecki et al. |
| 2004/0154443 | A1 | 8/2004 | Zurecki et al. |
| 2004/0232258 | A1 | 11/2004 | Cerv et al. |
| 2004/0234350 | A1 | 11/2004 | Jager et al. |
| 2004/0237542 | A1 | 12/2004 | Zurecki et al. |
| 2005/0011201 | A1 | 1/2005 | Zurecki et al. |
| 2005/0016337 | A1 | 1/2005 | Zurecki et al. |
| 2005/0211029 | A1 | 9/2005 | Zurecki et al. |
| 2007/0175255 | A1 | 8/2007 | Pawelski et al. |

FOREIGN PATENT DOCUMENTS

| | | |
|---|---|---|
| DE | 4326517 A1 | 8/1993 |
| DE | 19600172 A1 | 8/1997 |
| EP | 0842722 A1 | 5/1998 |
| EP | 0711663 B1 | 7/1999 |
| EP | 0945222 A2 | 9/1999 |
| EP | 1580284 A2 | 9/2005 |
| EP | 1637257 A1 | 3/2006 |
| FR | 2724337 A1 | 3/1996 |
| FR | 2804492 A1 | 8/2001 |
| JP | 328397 | 11/1953 |
| JP | 6210105 | 1/1987 |
| JP | 63-62637 | 12/1988 |
| JP | 6031502 A1 | 2/1994 |
| JP | 6330077 A2 | 11/1994 |
| JP | 09-300172 | 11/1997 |
| JP | 11320328 A1 | 11/1999 |
| JP | 200065291 A1 | 3/2000 |
| JP | 2000296438 A1 | 10/2000 |
| JP | 2002059336 | 2/2002 |
| JP | 11156669 A1 | 12/2007 |
| KR | 1031498 A | 3/1989 |
| KR | 1182657 A | 5/1998 |
| KR | 1213993 A | 4/1999 |
| KR | 1512928 A | 7/2004 |
| WO | 92/16464 A1 | 10/1992 |
| WO | 9708486 | 3/1997 |
| WO | 98/10893 A1 | 3/1998 |
| WO | 9960079 | 11/1999 |
| WO | 02096598 | 5/2002 |
| WO | 03/002277 A1 | 1/2003 |
| WO | 03022517 | 3/2003 |
| WO | 03066916 | 8/2003 |
| WO | 2005/120739 A1 | 12/2005 |

OTHER PUBLICATIONS

U.S. Appl. No. 10/066,830, filed Feb. 4, 2002, Zurecki, Zbigniew et al.

U.S. Appl. No. 09/951,195, filed Sep. 13, 2001, Zurecki, Zbigniew et al.

U.S. Appl. No. 10/809,773, filed Mar. 25, 2004, Zurecki, Zbigniew et al.

U.S. Appl. No. 11/221,718, filed Sep. 9, 2005, Ghosh, Ranajit et al.

U.S. Appl. No. 11/250,346, filed Oct. 14, 2005, Zureck, Zbigniew et al.

U.S. Appl. No. 09/870,853, filed May 31, 2001, Zurecki et al.

Hong, Shane Y., et al., Micro-temperature Manipulation in Cryogenic Machining of Low Carbon Steel, Elsevier Journal of Materials Processing Technology 116 (2001) pp. 22-30.

"Mechanical Engineering Handbook (2nd Edition)", Editorial Board of Mechanical Engineering Handbook and Electrical Engineering Handbook, p. 1-16, 1-30, 4-3 and 2-41, China Machine Press.

D'Errico et al. "Performance of Ceramic Cutting Tools in Turning Operations," Industrial Ceramics, vol. 17, 1997, pp. 80-83.

Edwards, Cutting Tools 1993, The Institute of Materials, London, p. 20.

"Machining," Metals Handbook 9th Edition, vol. 16, 1996.

"Heat Transfer in Cutting Inserts", Kabala Andrze, Experimental Stress Analysis 2001.

Orlowicz, et al., "Effect of Rapid Solidification on Sliding Wear of Iron Castings", Wear 254 (2003), pp. 154-163.

Majumdar, et al., "Laser Surface Alloying - An Advanced Surface Modification Technology", Department of Metallurgical and Materials Engineering Indian Institute of Technology, Kharagpur-721302, India, I. W. W., Technical University of Clausthal, D-38678 Clausthal Zellerfield, Germany, pp. 1-11.

"White Layer Formation at Machined Surfaces and . . . ," B.J. Griffins, J. of Tribology, vol. 107/165, Apr. 1985.

"Machining Hard Materials with Geometrically . . . ," W. Konig, et al, Annals of CIRP, vol. 57, 1990.

"Potential and Limitations of Hard Turning . . . ," H.K. Tonshoff, et al, 1st Int. Machining and Grinding Conf. 1995.

"PCBN Tool Failure Mode Analysis," T.J. Broskea, Intertech 2000.

"Process Effects on White Layer Formation in Hard Turning," Y.K. Chou, et al, NAMRI/SME, 1998.

Biomedical Instrumentation and Tech., "Development of a High-Performance Multiprobe Cryosurgical Device", Chang, et al, 1994.

Thiele, et al., "Effect of Cutting Edge Geometry and Workpiece Hardness on Surface Generation in the finish Hard Turning of AISI 52100 Steel", Journal of Materials Processing Technology, 94 (1999), pp. 216-226.

Ozel, et al., "Effects of Cutting Edge Geometry, Workpiece Hardness, Feed Rate and Cutting Speed on Surface Roughness and Forces in Finish Turning of Hardened AISI H13 Steel", Department of Industrial and Systems Engineering, Rutgers, The State University of New Jersey, Piscataway, New Jersey 08854 UDS, pp. 1-33.

J.Y. Huang, et al., "Microstructure of Cryogenic Treated M2 Tool Steel," Materials Science and Engineering A339 (2003) 241-244.

Chang-Xue (Jack) Feng, "An Experimental Study of the Impact of Turning Parameters on Surface Roughness", Paper No. 2036, Proceedings of the 2001 Industrial Engineering Research Conference, pp. 1-9.

F. Gunnberg, "Surface Integrity Generated by Hard Turning," Thesis, Dept. of Product Development, Chalmers University of Technology, Goteborg, Sweden, 2003.

Mehrotra, P.K., Ph.D.; "Applications of Ceramic Cutting Tools"; Key Engineering Materials; Trans Tech Publications, Switzerland; 1998; vol. 138-140; pp. 1-24.

Dewes, R.C., et al; "The Use of High Speed Machining for the Manufacture of Hardened Steel Dies"; Trans. NAMRI/SME; 1996; pp. 21-26.

"Numerical and Experimental Simulation for Cutting Temperature Estimation using 3-dimensional Inverse Heat Conduction Technique," F. R. S. Lima, et al.

E. M. Trent and P. K. Wright, "Metal Cutting", 4th Ed., Butterworth, Boston, Oxford, 2000.

ASM Handbook, 9th Ed., vol. 16, "Machining Ceramic Materials," 1995.

Zurecki, Z., et al; "Industrial Systems for Cost Effective Machining of Metals Using an Environmentally Friendly Liquid Nitrogen Coolant"; Aerospace Mfg. Tech. Conf; Jun. 2-4, 1998; Paper No. 981,865.

Zurecki, Z., et al; "Dry Machining of Metals with Liquid Nitrogen"; 3rd Intl. Machining & Grinding '99 Conference and Exposition; Oct. 4-7, 1999; Cincinnati, OH; pp. 1-26.

Lin, J., et al; "Estimation of Cutting Temperature in High Speed Machining"; Trans. Of the ASME; vol. 114; Jul. 1992; pp. 290-296.

S545-type milling cutter made by Niagara Cutter (http://www.niagaracutter.com/techinfo).

"Machining Data Handbook," 3rd Edition, vol. 1 and 2, Machinability DataCenter, IAMS, Inc. 1980.

"Application of Metal Cutting Theory," F. E. Gorczyca, Industrial Press, New York, 1987.

"Analysis of Material Removal Processes," W. R. DeVries, Springer Texts in Mechanical Eng., Springer-Verlag, 1992.

"Ceramics and Glasses, Engineered Materials Handbook," vol. 4, ASM Int., The MatIs Information Soc., '91.

ASM Specialty Handbook, "Tool Materials," Ed. J. R. Davis, 1998.

"Microstructural Effects in Precision Hard Turning," Y. K. Chou; C. J. Evans, MED-vol. 4, Mfg. Sci. and Engr., ASME 1996.

Kitagawa, T., et al; "Temperature and wear of cutting in high-speed machining of Inconel 718 and Ti6Al-6V-2Sn"; Wear 202; 1997; Elsevier; pp. 142-148.

"The Lindenfrost phenomenon", F. L. Curzon, Am. J. Phys., 46 (8), Aug. 1978, pp. 825-828.

"A boiling heat transfer paradox", G. G. Lavalle et al., Am. J. Phys., vol. 60, No. 7, Jul. 1992, pp. 593-597.

"Cooling by immersion in liquid nitrogen", T. W. Listerman et al., Am. J. Phys., 54 (6), Jun. 1986, pp. 554-558.

"An Analytical Method to Determine the Liquid Film Thickness Produced by Gas Atomized Sprays", J. Yang et al., J. of Heat Transfer, Feb. 1996, vol. 118, pp. 255-258.

"Optimizing and Predicting Critical Heat Flux in Spray Cooling of a Square Surface", I. Mudawar and K. A. Estes, J. of Heat Transfer, Aug. 1996, vol. 118, pp. 672-679.

"Film Boiling Under an Impinging Cryogenic Jet", R. F. Barron and R. S. Stanley, Advances in Cryogenic Engineering, vol. 39, Ed. P. Kittel, Plenum Press, New York, 1994, pp. 1769-1777.

"CRC Materials Sci. & Engineering Handbook," 2nd Edition, CRC Press, 1994, Edited by J. F. Shackelford et al.

"Transport Phenomena," R. R. Bird et al., John Wiley & Sons, 1960.

* cited by examiner

METHOD AND APPARATUS FOR MACHINING WORKPIECES HAVING INTERRUPTIONS

This invention claims the benefit of provisional application U.S. Ser. No. 60/611,015 filed Sep. 16, 2004, incorporated herein by reference.

BACKGROUND OF THE INVENTION

The present invention relates to the machining of materials, and more particularly is a method and apparatus for increasing cutting tool life when machining materials with interruptions by cutting such as occurs in turning, facing, boring, milling, and drilling with cutting inserts.

Interruptions can be simple voids or portions of material with significantly different resistance to cutting. When interruptions exist in a material, the cutting force intermittently drops to a fraction of the maximum cutting force as the cutting edge passes over the interruption, e.g. to less than 50% of the maximum cutting force. (For the case of a void, the cutting force will drop to zero.) The size of the interruption must be large enough relative to the curvature of the cutting edge in the feed plane in order for the tool to experience an interruption in the force on the tool.

Interrupted cutting is a difficult machining operation, due to a shock-wave-type cyclic thermal and mechanical loading of the tool. Interruptions in workpieces act as impact stress-concentrators inducing premature fractures of the tool insert. The use of the conventional flooding or jetting cooling medium, applied "externally" to the cutting tool and/or in the general area of contact between the tool and the work material results in cooling and hardening of the edges of the material interruptions, leading to higher impact forces on the insert, and thereby leads to accelerated tool wear and failure, usually by fractures. The absence of cooling shortens the life of the cutting tool due to operation at high temperature involving thermal softening and chemical wear of the cutting edge as well as the rest of the insert. The net result is that tool life is drastically shorter during interrupted cutting relative to non-interrupted cutting whether the cooling is used or not. Most interrupted cutting operations are run dry to prevent cooling and hardening of interruption edges and at slow speeds to prevent thermal softening of the cutting tool.

As used herein, the term "cutting" includes but is not limited to the following operations: turning, boring, parting, grooving, facing, planing, and milling.

Related disclosures include U.S. Pat. Nos. 2,641,047, 3,077,802, 3,571,877, 3,971,114, 4,848,198, 5,237,894, 5,716,974, 5,901,623, 6,652,200 and U.S. patent applications Ser. Nos. 2002/0189413 and 2003/0110781. There is a need for a method that increases the tool life for interrupted cutting.

BRIEF SUMMARY OF THE INVENTION

This invention provides a method of cutting a workpiece having interruptions, with a cutting insert, said cutting insert having a cutting edge, said cutting insert held in a tool holder, said method comprising the steps of contacting said cutting edge of the insert with said workpiece having interruptions; introducing a coolant fluid into at least one passage near said cutting edge of the insert to cool said cutting edge; and exhausting the resultant fluid from the at least one passage in a direction so that said interruptions ahead of the cutting edge are not substantially cooled by the resultant fluid.

This invention further provides a method in which after said introducing step and before said exhausting step is the step of evaporating at least a portion of said coolant fluid in said at least one passage.

This invention further provides an apparatus for cutting a workpiece comprising a tool holder and a cutting insert, said cutting insert having a cutting edge, said cutting insert being held in said tool holder, said apparatus further comprising a passage for a coolant fluid near said cutting edge for cooling said cutting edge.

To solve the problem of shortened life of cutting inserts during interrupted cutting, the current invention uses a cooling system using a coolant fluid that cools the cutting insert without any substantial thermal effect on the edges of interruptions of the workpiece that are about to be machined. The coolant fluid may be carbon dioxide, helium, nitrogen, argon, or mixtures of the above fluids, preferably nitrogen or argon or mixtures of nitrogen and argon. The coolant fluid may be a cryogenic fluid.

The benefits of the current invention are especially apparent in hard, interrupted cuts, where expensive, high fracture-toughness, ultra-hard materials, e.g. polycrystalline cubic boron nitride (PCBN) or silicon carbide whisker-reinforced alumina ($SiC_w$—$Al_2O_3$) are usually the insert materials of choice, due to their predictability of life during machining operations. The method and apparatus of this invention can be used with those insert materials for interrupted cutting.

Inexpensive, plain and/or compounded with titanium carbide or carbo-nitride particle alumina inserts ($Al_2O_3$—TiC and $Al_2O_3$—TiCN), called by industry practitioners, "ceramic inserts," "alumina inserts," or "black ceramics" are generally not used in hard, interrupted cuts, due to their low fracture toughness and consequently unpredictable, catastrophic failures. "Ceramic inserts," "alumina inserts," and "black ceramics" are oxide-containing ceramic inserts typically containing at least 5% by weight of an oxide ceramic phase. Using the method and apparatus of this invention, these inexpensive alumina inserts have been found to be useful in the interrupted cutting operations and may in some cases outperform, via reduced machining time and tool costs, the expensive PCBN and/or $SiC_w$—$Al_2O_3$ inserts when used in conventional methods. The present invention utilizes an efficient cooling method for interrupted cutting operations. Any commercially available cutting tool inserts may be used in this invention for machining hardened or soft workpieces. The cutting tool inserts include the relatively inexpensive alumina, uncoated or coated carbide tool inserts or any other standard tool inserts which may be made of lower fracture toughness resistance materials, and more expensive inserts including those made of PCBN $SiC_w$—$Al_2O_3$, $Si_3N_4$, and/or diamond.

The current invention is a method for cutting a workpiece having interruptions, with a cutting insert having a cutting edge, where the cutting insert is held in a tool holder and is optionally supported by a shim. Coolant fluid is introduced through a conduit to a cooling passage located near the cutting edge. The cooling passage may be located either under, behind, or under and behind the cutting edge. "Behind" means in the direction of the backside of the cutting insert. "Under" means in the direction of the bottom of the cutting insert. The cooling passage can be located within the cutting insert, between the cutting insert and the shim, within the cutting insert, between the shim and the tool holder, within the tool holder, or in a combination of these locations. Fast-moving liquid droplets or liquid slugs of the cooling fluid impact the wall surfaces of the cooling passage near the cutting edge where the liquid droplets or liquid slugs are partly evaporated. The machining terminology used in this application is standard for the machining technology area as described in numerous subject references, e.g. "Metal Cutting", IV Edition, E. M. Trent and P. K. Wright, publ. by Butterworth Heinemann, Boston, Oxford, pp.: 10, 12, 15, and 18.

BRIEF DESCRIPTION OF SEVERAL VIEWS OF THE DRAWINGS

FIG. 1 is a cross sectional view from the side of one embodiment of the present invention showing the cooling passage in an insert-supporting shim adjoining the cutting insert and where the coolant is fed through a passageway through the bottom of the tool holder.

FIG. 2 is a cross-sectional view through the shim and cooling passage of the apparatus shown in FIG. 1 taken along the line B-B' shown in FIG. 1.

FIG. 3 is a cross sectional view from the side of another embodiment of the present invention showing the cooling passage in the shim. This figure illustrates a composite tool insert having a brazed PCBN tip.

FIG. 4 is a cross sectional view from the side of another embodiment of the present invention showing the cooling passage in the tool holder and adjoining the shim and where the coolant is fed through a passageway through the back of the tool holder.

FIG. 5 is a cross sectional view from the side of another embodiment of the present invention showing the cooling passage in the tool holder.

FIG. 6 is a cross sectional view from the side of another embodiment of the present invention showing the cooling passage in the cutting insert.

FIG. 7 is a cross sectional view from the side of another embodiment of the present invention showing the cooling passage in the tool holder adjoining the cutting insert without a shim.

FIG. 8 is a cross sectional view of another embodiment of the present invention, a rotating or stationary cutting tool equipped with inserts useful for a milling cutter, plunger, or drill.

FIG. 9 is a graph illustrating the effect of the invention on tool life.

FIG. 10 is a graph illustrating tool life for various inserts and operating conditions.

DETAILED DESCRIPTION OF THE INVENTION

Figure 1:
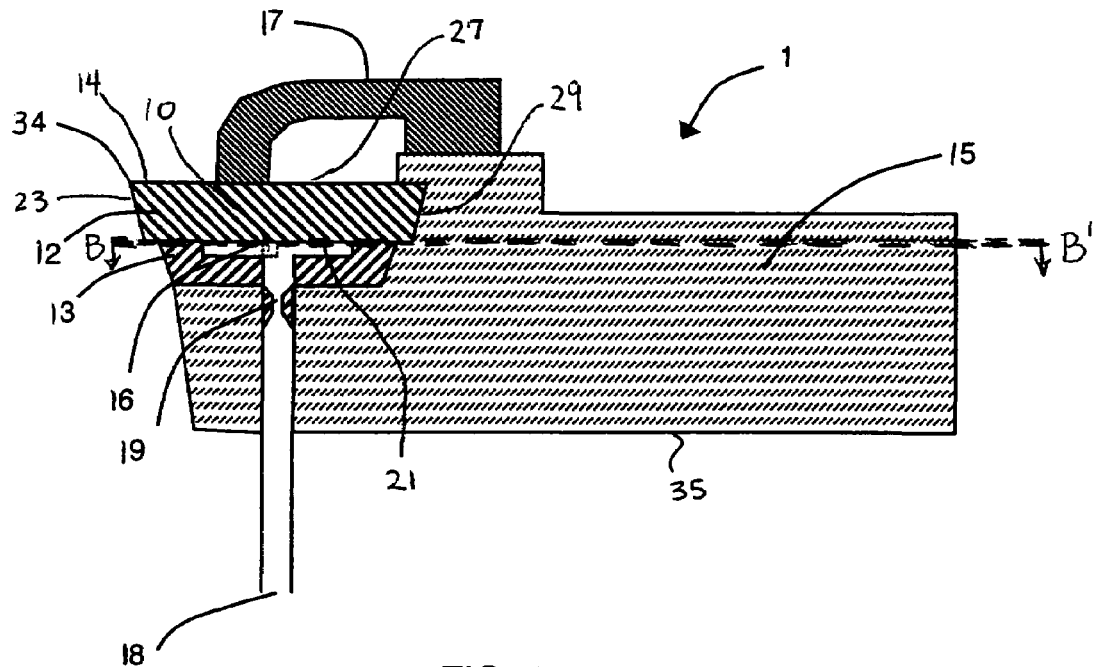
FIGS. 1 through 8 illustrate several embodiments of the apparatus of the current invention that are useful in the method of this invention, like items bearing like reference numerals.
Figure 2:
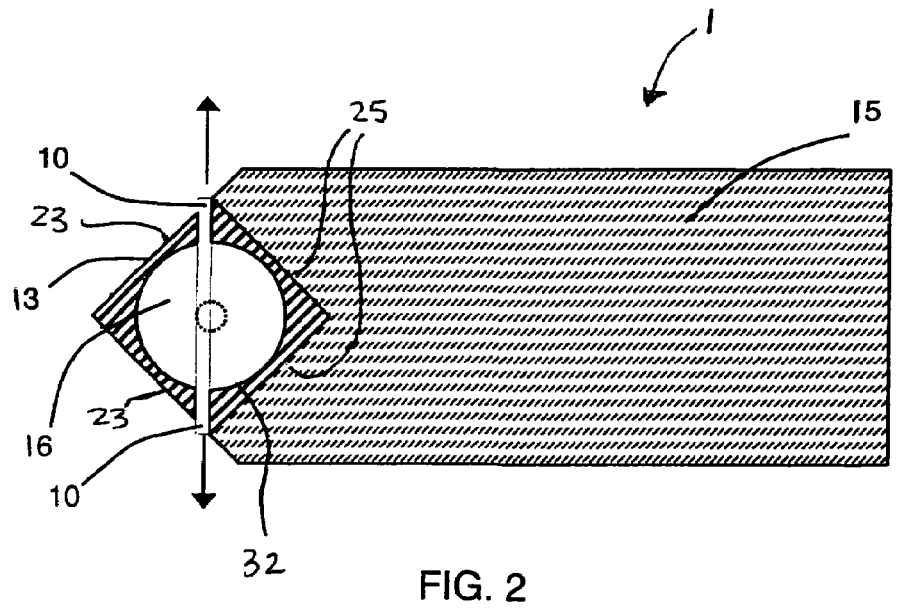

FIGS. 1 and 2 show two views of one embodiment of an apparatus or cutting tool 1 suitable for carrying out the method of the current invention. The apparatus 1 comprises a tool holder 15 for supporting a cutting insert 12 and an optional shim 13, which is located below the cutting insert 12. Although optional, shims are generally used. The insert 12 and shim 13 can be held in place by any suitable means known in the art, such as a screw or clamp, and are shown held in place by a clamp 17. A cutting edge 14 adapted to contact and cut a workpiece (not shown) is located at the intersection of the major flank surface 23 and the rake 27 of the cutting insert 12. The backside 29 of the cutting insert is located opposite to the major flank surface 23. The rake 27 is the surface of the cutting insert 12 (and may be the surface of the cutting tool) adjacent the cutting edge 14 that directs the chip (the piece of the workpiece that has been removed from the workpiece by the machining process) away from the workpiece. The rake 27 may be completely flat, chamfered or may have a more complex, three-dimensional topography produced by molding or by the addition of a plate in order to control the chip flow and/or chip breaking during machining. The apparatus 1 is deigned for use in conjunction with machining equipment, including lathes, milling machines, and the like.

The shim 13 is shaped to form a cooling passage 16 shown adjoining the cutting insert 12. Alternatively a passage, such as a pipe or other conduit, may be inserted into the shim 13 and/or cutting insert 12 and/or tool holder 15 in a space provided in them for the passage for the coolant fluid. The shim can be preformed or machined into the appropriate shape. The cooling passage 16 is open at its inlet(s) 18 in fluid communication with the passage 16 and at its outlet(s) 10 where the coolant fluid exists passage 16. Preferably the passage 16 does not contain any porous material. The inlet 18 fluidly communicates with the cooling passage 16 and an optional restriction 19, e.g. nozzle or orifice. The restriction 19 may (a) help in metering the cooling fluid, (b) assure a more stable flow of cooling fluid through the passage upstream of the restriction 19 by providing a significant pressure drop, (c) enhance liquid phase break-up into droplets by inducing Rayleigh instabilities, (d) promote evaporative atomization of the incoming cooling fluid by a pressure drop that reduces the boiling temperature and generates vapor bubbles within the liquid, thus, breaking the liquid apart, and (e) further enhance removal of heat from the cooled surfaces by widening temperature differences due to the lower boiling point of the cryogenic liquid downstream, in the lower pressure area. The restriction may act as a pressure changing means. As shown in FIG. 1, the restriction 19 and at least a portion of the passage 16 is oriented to direct the incoming coolant fluid in a direction that is perpendicular to the bottom 21 of the insert 12 before eventually flowing through a contact volume 32 which in this embodiment is a disk-shaped volume 32 which is part of passage 16. (In alternative embodiments the contact volume may have any shape that may provide for increased heat transfer between the coolant and the parts of the tool holder, e.g. a passage with fins. Alternatively the contact volume may maintain the same dimensions as the passage, if desired.) As shown, the disk-shaped contact volume 32 is located parallel to and in contact with the bottom of the insert 12 in passage 16. After passing through the restriction 19, the coolant fluid impacts the bottom 21 of the insert 12 which breaks the cooling fluid into liquid droplets or slugs thereby helping to break through any vapor layer that may form on the bottom surface 21 and thereby increasing heat transfer. The breakup of the cooling fluid can be accomplished by boiling on decompression, boiling on the walls of the passage, or by surface (Rayleigh) instabilities as the liquid passes through the restriction 19. The restriction 19 in the passage 16 as shown is located in the apparatus 1. The restriction 19 in the passage 16 may be located in the tool holder 15, the shim 13 or the insert 12, or in the passage 16 between the tool holder 15 and the shim 13, between the insert 12 and the tool holder 15, or between the insert 12 and shim 13. The restriction 19 may provide for a pressure drop in the passage 16. Alternatively or additionally the passage 16 may be a pressure changing means by being shaped so that the pressure drops through the passage 16 from inlet(s) 18 to outlet(s) 10.

As shown in FIG. 2, the cooling passage 16 has outlets 10 which are formed by shaping, e.g. machining, cutting, or boring the shim 13, alone or by inserting a pipe or other conduit therein. Outlets 10 are formed to direct the coolant away from the workpiece or at least away from the surface of the workpiece which shall be machined in a short time, that is, away from the surface of the workpiece, particularly the edges of the interruptions ahead of the cutting edge.

As shown in FIG. 2, the passage is internal to the tool holder 15, and the shim 13, and the cooling achieved by the coolant fluid is by direct contact with the cutting insert 12; however, through indirect contact between the coolant fluid and the cutting edge 14 of the insert 12. The inlet 18 for the coolant fluid into the tool holder 15 is at the bottom 35 of the tool holder, and the direction of the inlet 18 and coolant flow therein is perpendicular to the bottom 21 of the insert 12.

The shim 13 can be made from any suitable material known in the art such as tungsten carbide-cobalt (WC—Co), tool steel or high-speed steel (HSS). The tool holder 15 is also made from any suitable material know in the art.

Figure 3:
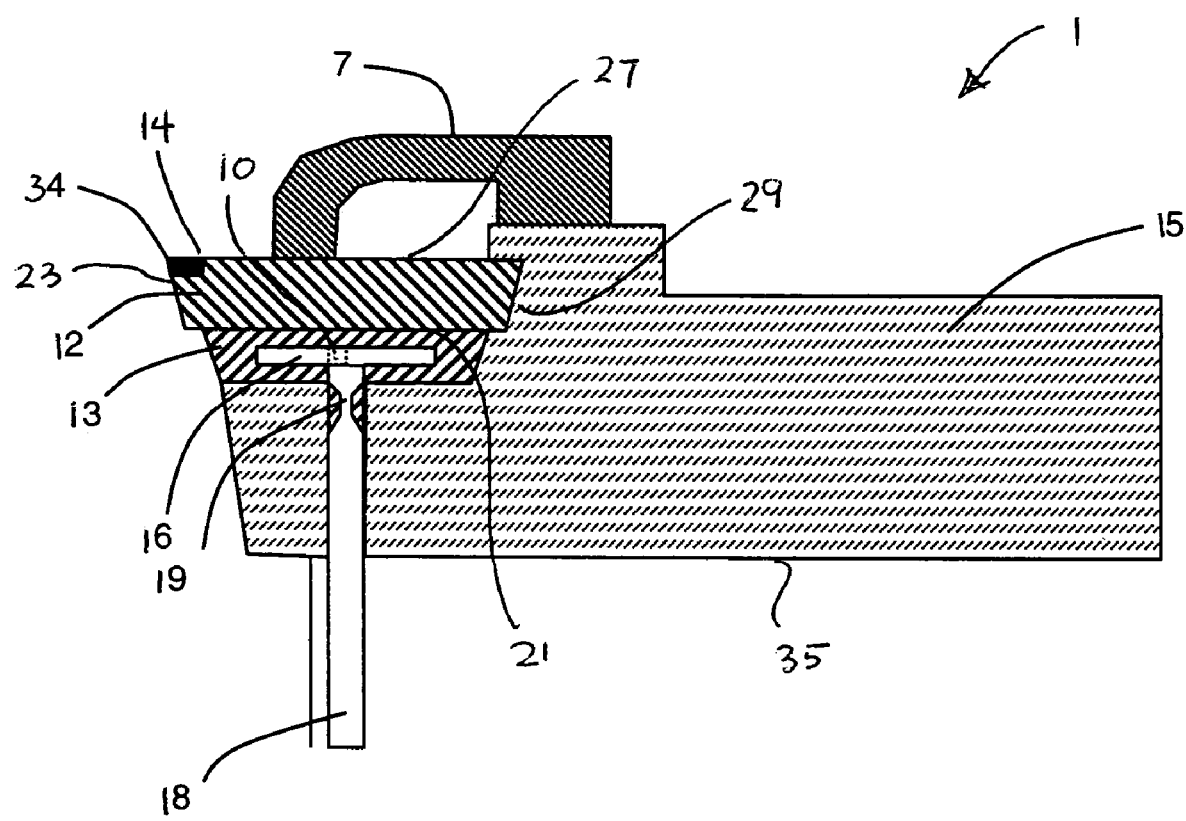

FIG. 3 shows an embodiment where the cooling passage 16 is enclosed within the shim 13. The passage 16 is also internal to the tool holder. Like the embodiment shown in FIG. 1 and FIG. 2, the outlets 10 are formed to the sides thereby directing any coolant away from the surface of the workpiece to be machined by the apparatus 1.

Figure 4:
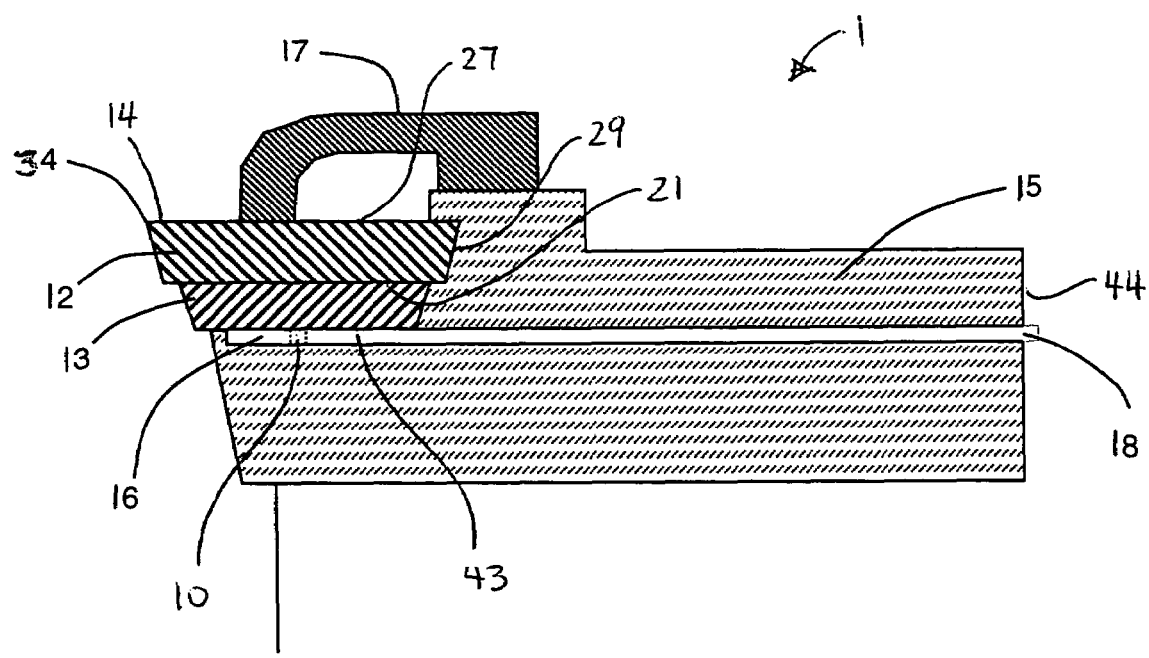

FIG. 4 shows an embodiment where the cooling passage 16 is in the tool holder 15 adjoining the shim 13. FIG. 4 shows an alternative arrangement of the cooling passage 16. The passage 16 is parallel to the bottom 21 of the insert and partially defined by (open to) the bottom 43 of the shim 13. The inlet 18 of the passage 16 is located at the backside 44 of the tool holder 15. The coolant flows in the passage 16 and contacts the bottom 43 of the shim 13.

Figure 5:
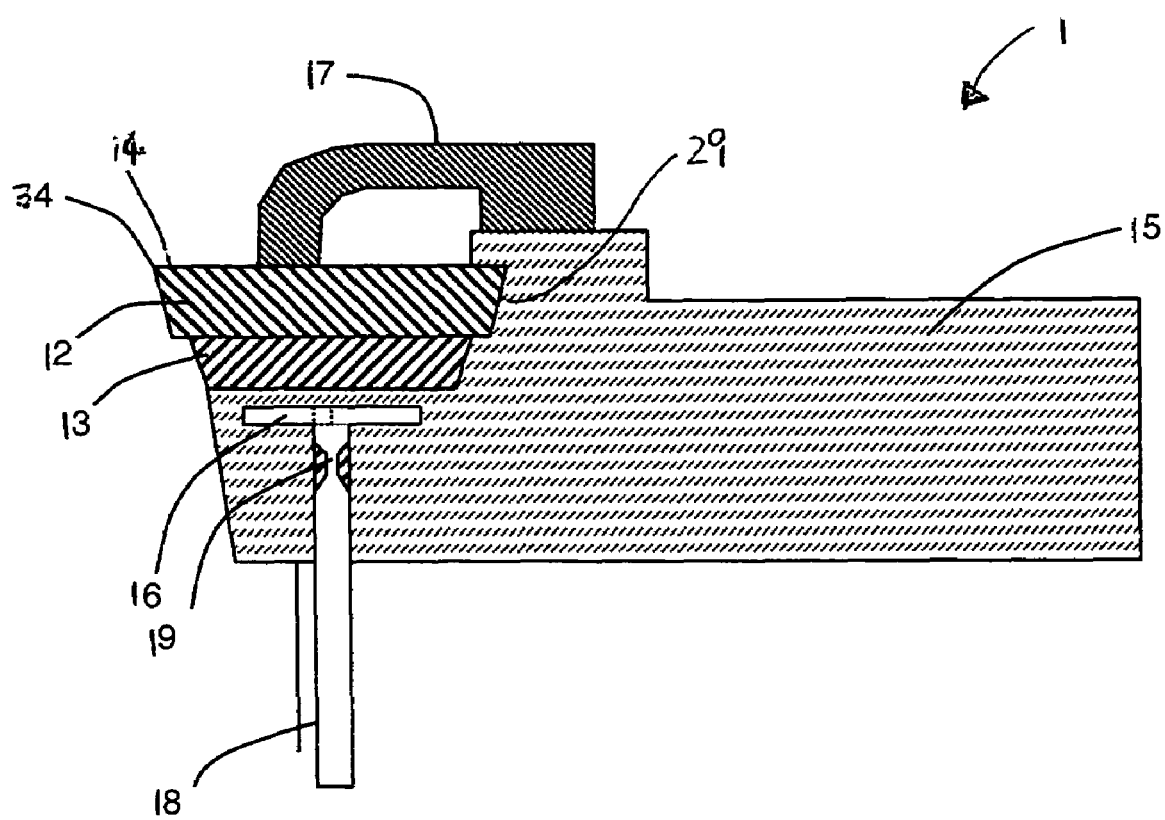

FIG. 5 shows an embodiment of the apparatus 1 of this invention where the cooling passage 16 is in the tool holder 15. In this embodiment shown in FIG. 5 the cooling provided by the coolant fluid will be indirect to the shim 13 and indirect to the cutting tool 12, and indirect to the cutting edge 14.

Figure 6:
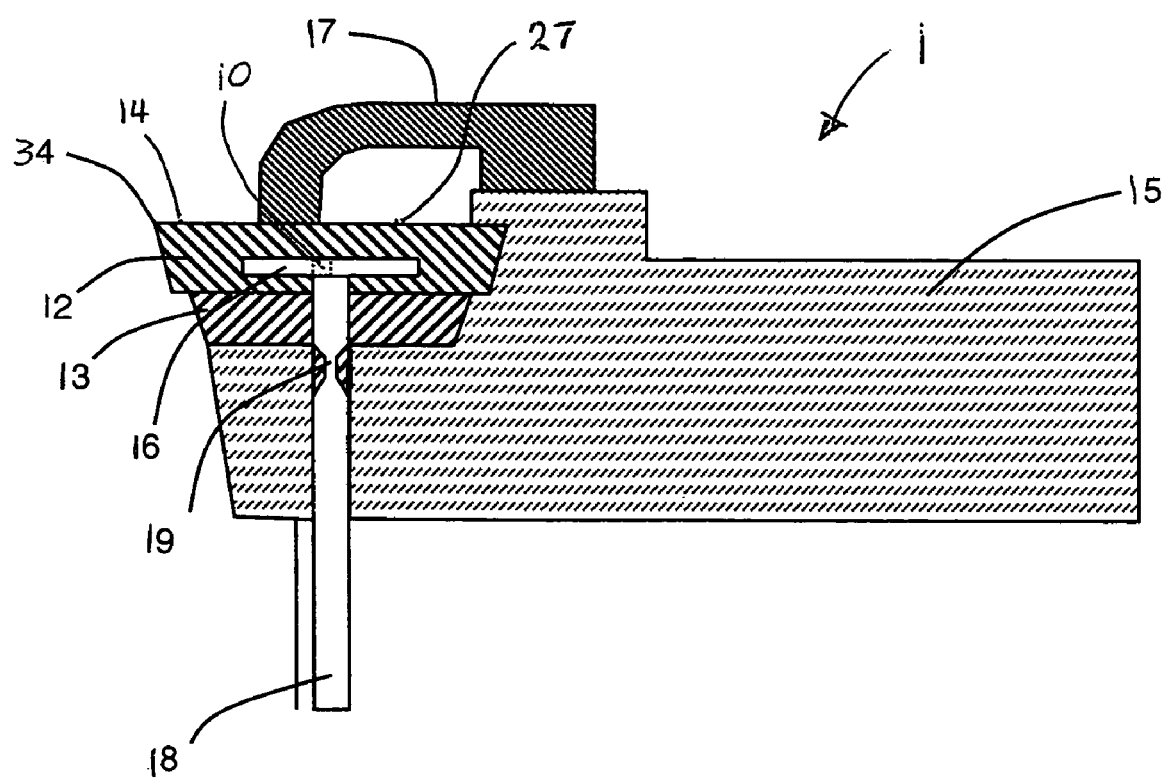

FIG. 6 shows an embodiment where the cooling passage 16 is at least partially located inside the cutting insert 12. In this apparatus, the cooling passage 16 is positioned near the cutting edge 14 below the rake 27. The cutting insert is manufactured with the cooling passage 16 therein. A possible advantage of creating the cooling passage 16 in the shim 13 or the tool holder 15 as opposed to the cutting insert 12 is that the shim 13 and tool holder 15 can be, usually, used with many types of standard cutting inserts 12; no special, grooved or cored inserts are therefore required. However, the advantage of the cooling passage 16 in the insert 12 is the minimized distance between the cutting edge 14 and the coolant fluid wetted walls of the passage 16 which assures the best cooling effect. Despite the closeness of the coolant fluid to the cutting edge 14, the cooling is still indirect. Direct cooling would take place by spraying or otherwise contacting the coolant fluid directly to the outside surface of the cutting edge 14.

Figure 7:
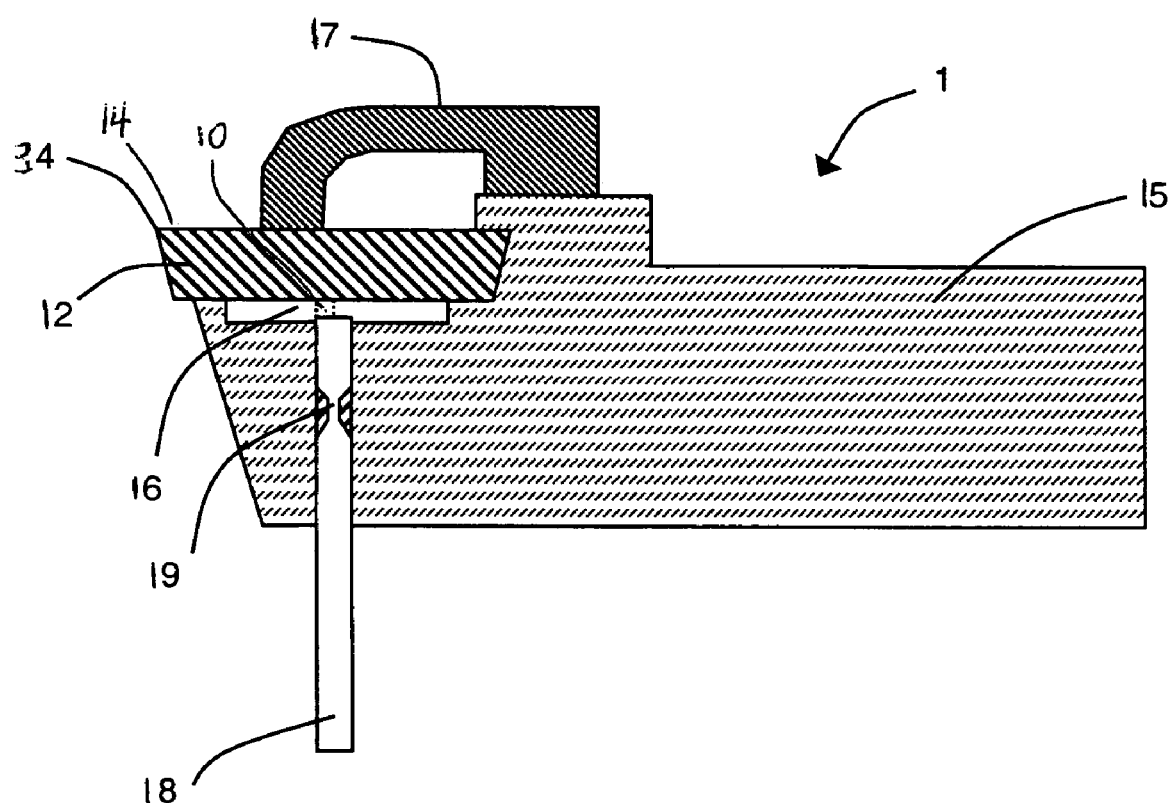

FIG. 7 shows an embodiment where a shim is not used. The cooling passage 16 is shown inside the tool holder 15 adjoining the cutting insert. Other than removing the shim, the embodiment shown in FIG. 7 is the same as that shown in FIG. 1 and FIG. 2.

Figure 8:
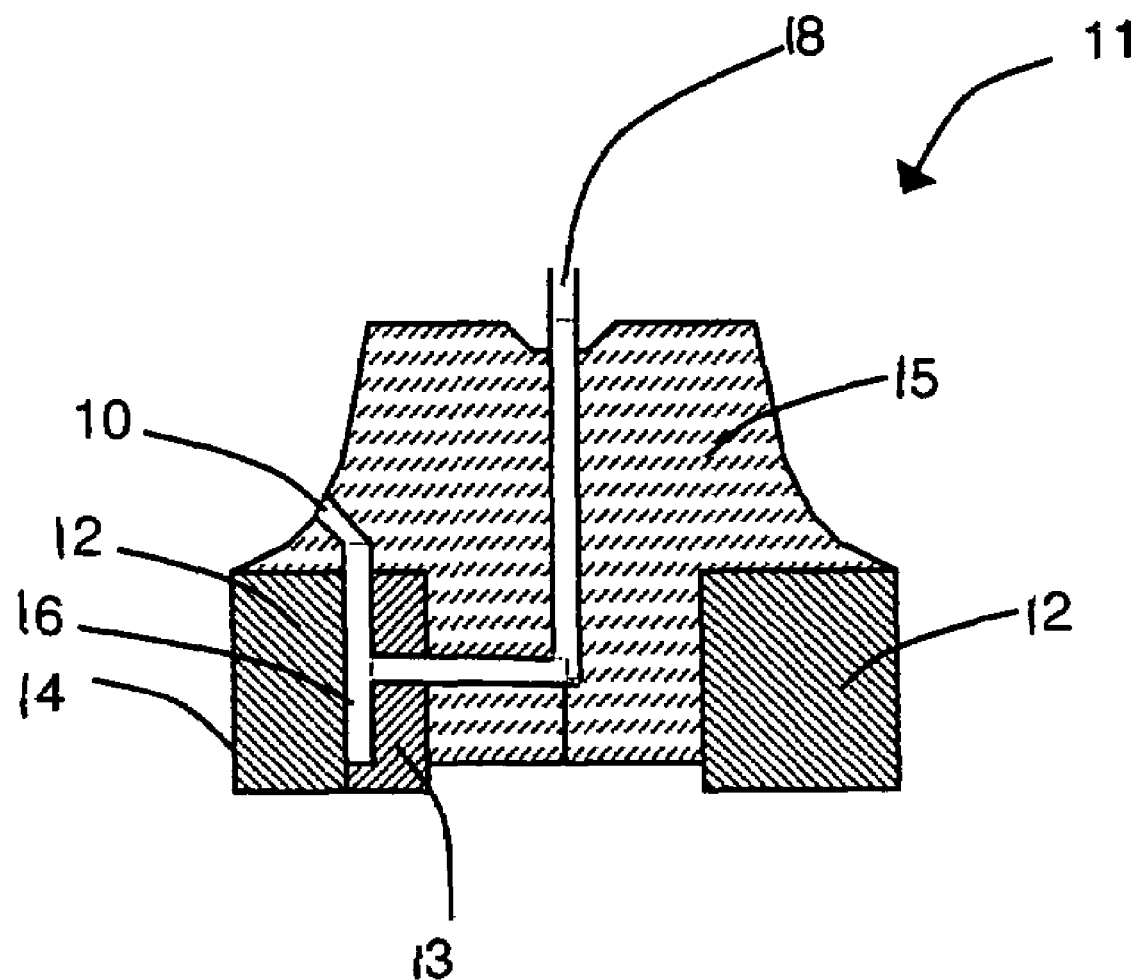

FIG. 8 shows an apparatus of the invention, that is a rotating or stationary cutting tool equipped with inserts useful as a milling cutter, plunger, or drill. The apparatus 11 comprises a tool holder 15 supporting a cutting insert 12 and an optional shim 13, which is located between the tool holder 15 and the cutting insert 12. A cutting edge 14 adapted to contact and cut a workpiece is shown as part of the cutting insert 12. A passage 16 with inlet 18 for flow of a coolant fluid is shown to provide for the direct contact of the coolant fluid with a surface of the cutting insert 12 opposite to the cutting edge 14 of the cutting insert 12. The cooling passage 16 has outlet 10 which is formed by shaping the shim 13 and the tool holder 15 to provide for the outlet 10. Outlet 10 is formed to direct the discharged coolant away from the surface of the workpiece to be machined (cut).

In an alternative variation of any embodiment of the invention, the discharged coolant fluid can be directed at the workpiece surface that has already been machined, but not at the surface to be machined. In this variation, the discharged coolany fluid may help to remove broken chips from under the tool which is desirable and may prevent development of residual tensile stresses in the already machined surface which is also desirable.

In most of the embodiments shown the outlets 10 discharge the spent coolant to the sides of the cutting edge 14. Alternatively, the exit for the spent coolant may be at the bottom of the tool holder 15 (forcing the fluid to make a U-turn), or in any direction although preferably substantially all, if not all, of the spent coolant is directed away from the surface of the workpiece to be machined (ahead of the cutting edge). Material ahead of the cutting edge is material that is to be cut during the current pass or in the next few passes. Material behind the cutting edge is material that has been cut before or during the current pass. Additionally, it is preferred that the outlet for the spent coolant fluid is a short distance from where the coolant fluid has gone through the contact volume of the passage or otherwise has had an impact on the temperature of the cutting edge by direct contact with the cutting insert, the shim, or other part of the tool. The impact on the temperature of the cutting edge may be due to the coolant fluid undergoing a phase change in the passage 16.

Certain embodiments of the apparatus can be made with minimal modifications to standard parts. For the embodiment shown in FIGS. 1 and 2, there are no modifications to the cutting insert 12 and only a minor modification to the tool holder 15 to provide a passage 16 for the coolant. The shim 13 can be shaped by machining or other means to form at least one cooling passage 16 and outlets 10 for the removal of the spent coolant out of the passage 16.

The total cross-sectional area of the outlets should be larger than the cross-section of the restriction 19, in order to realize the decompressive temperature drop and maximize the temperature difference between the cutting edge 14 and the cooled walls of the passage 16. This relative sizing of the restriction and the outlet(s), (a) helps in metering the cooling fluid, (b) assures a more stable flow of coolant fluid (e.g. cryogenic fluid) through the conduits up-stream by the way of maintaining an elevated pressure up-stream, (c) enhances liquid phase break-up into droplets by inducing Rayleigh instabilities in the coolant fluid, (d) promotes evaporative atomization of the incoming coolant fluid by pressure drop that reduces boiling temperature and generates vapor bubbles within the liquid in the coolant fluid, thus, breaking the liquid apart and, (e) further enhances removal of heat from the cooled surfaces by widening temperature differences due to the lower boiling point of the liquid in the coolant fluid (e.g. cryogenic liquid) downstream, in the lower pressure area.

For the purposes of this disclosure, interruptions are defined to exist in a workpiece material when the cutting force intermittently drops to less than 50% of the maximum cutting force as the cutting edge passes over the interruption. (For the case of a void, the cutting force will drop to zero.) The size of the interruption must be large enough relative to the curvature of the cutting edge in the feed plane in order for the tool to experience an interruption in the force on the tool. Examples of materials with interruptions include slotted bars, out-of-round rolls, rings with keyways or holes, gears, composite parts such as cast iron and aluminum composited components used in engine blocks, hypereutectic Al-Si alloys characterized by distinctively large silicon crystals in the eutectic Al-Si matrix, metallic and non-metallic composite materials where the size of the hard, strengthening particles or inclusions is comparable to or larger than the radius of the curvature of the cutting tool in the feed plane, porous powder metallurgy parts, and porous powder metallurgy parts with pores filled using a polymer material, as well as certain grades of tool steels, where the size of their primary carbides is sufficiently large to be comparable to or exceeding the radius of the curvature of the cutting tool in the feed plane. Another example of the interrupted cutting within the scope of present invention is turning of non-axial, irregularly shaped workpieces where the tool engagement in material, i.e. depth of cut or feed rate or both, fluctuates during each revolution.

The method also includes the step of introducing a coolant fluid comprising liquid nitrogen into at least one cooling passage near the cutting edge of the insert which may be near or contacting the bottom of the insert. The cooling passage can be positioned in one or more locations near the cutting edge which may be internal to the tool holder and below the rake. The passage and/or the contact volume of the passage may be located (a) between the cutting insert and the shim, (b) between the cutting insert and the tool holder, (c) between the shim and the tool holder, (d) within the cutting insert, (e) within the shim, or (f) within the tool holder.

The coolant fluid can be slightly subcooled coolant fluid (e.g., liquid nitrogen) or preferably a saturated two phase mixture of coolant fluid (e.g. liquid and gaseous nitrogen). Slightly subcooled coolant fluid (e.g. liquid nitrogen) will break up into droplets or slugs of liquid in gas as it passes through the optional restriction. The restriction will tend to atomize the liquid coolant (e.g. nitrogen) to form droplets or slugs of liquid. A two phase mixture of liquid and gaseous coolant (e.g. nitrogen) will already contain droplets or slugs of liquid. The breakup of the liquid into droplets or slugs can be accomplished by boiling on decompression, boiling on the walls of the passageway, or by surface (Rayleigh) instabilities as the liquid passes through the nozzle or orifice. The droplets or slugs of liquid impact the walls of the cooling passage for improved heat transfer.

Because of the thermal inertia of the insert and optional shim that conduct heat away from the cutting edge, a slight flow and pressure pulsation in the coolant (e.g. liquid nitrogen) supply is acceptable, e.g. 5 sec. cycle, until the flow of the coolant reaches steady state after starting to machine a workpiece and cool the insert. The method and apparatus of this invention can improve tool life in interrupted cutting (machining) over the conventional dry or flood methods.

The present invention may be used for machining noninterrupted workpieces, too. It would be beneficial to use the method and apparatus of this invention for noninterrupted workpieces for which the chip gets in the way of a nozzle that provides an external flood or spray of coolant to the insert and/or workpiece, or 2) when an external flood or spray of coolant cools the chip which in turn enhances the depth of cut notch failure. For noninterrupted cutting, the present method may be deficient to jetting of LIN on the cutting edge and the workpiece as taught in U.S. patent application No. 2002/0189413, incorporated herein by reference.

In the at least one cooling passage which may be the contact volume, at least a portion of the liquid coolant (e.g. nitrogen) is evaporated to create a resultant fluid containing gaseous and liquid coolant. All of the liquid coolant may not evaporate due to the small size of the passages. Insufficient cooling may be obtained when there is complete evaporation of the coolant (e.g. liquid nitrogen).

Proper coolant flow rates can be determined by visual inspection. Flow rates of the coolant are adjusted by manipulating at least one of the supply pressure and degree of subcooling. When the spent coolant, which may be referred to as resultant fluid, exiting at 10 is clear, that indicates that there was no evaporation in the cooling passage, and that the coolant flow is too high or there is too much subcooling of the coolant in the coolant (e.g cryogenic) supply system. If the spent coolant (resultant fluid) exiting at 10 is a whitish liquid/gas mixture, then evaporation is present in the cooling passage and the flow rate of the coolant is satisfactory. If the spent coolant exiting at 10 has no liquid phase, the flow rate may be too low. To confirm the satisfactory flow rate condition, a splash plate can be used. The resultant fluid exiting at 10 impacts the metal splash plate. If after a while of operation a liquid coolant (e.g. cryogen) collects on the plate and drips, the flow is satisfactory. Once proper coolant (cryogenic coolant or liquid $CO_2$) flow rates are established, the cutting tool can be used for machining.

Another step in the invention is exhausting the spent coolant in a direction substantially away from the workpiece so that the edges of the interruptions are not substantially cooled by the spent coolant. (The spent coolant may be exhausted to the atmosphere under pressure or exhausted to a collection container for recycle and reuse elsewhere if desired.) This prevents hardening of the edges of the material interruptions, that result in higher impact forces on the insert, and thereby can lead to accelerated tool wear and failure, usually by fractures. It is generally acceptable to discharge the cryogen at the workpiece surfaces that have already been machined. In fact, this sometimes helps in residual stresses of chip removal, as in milling or indexible insert drilling.

The following example is provided to illustrate the invention and is not intended to restrict the scope thereof.

EXAMPLE 1

Interrupted Cutting Using Dry Uncooled and Cooled Ceramic Insert

Figure 9:
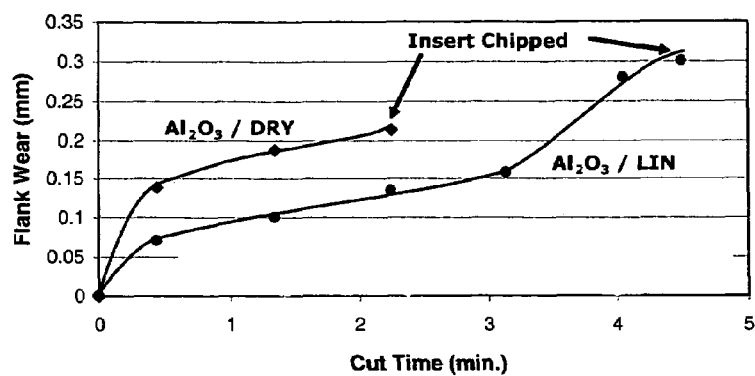
FIGS. 9 and 10 are graphs showing experimental data relating to the current invention.

FIG. 9 shows flank wear versus the cutting time for relatively inexpensive alumina tools, so-called black ceramic (Al2O3) inserts under dry cutting conditions and with liquid nitrogen (LIN) cooling according to the current invention where the cooling passage was in the shim as illustrated in FIG. 1. The workpiece material was 52100 bearing steel (heat-treat hardened to 50-56 HRc). The interruption in the workpiece was a 3/16" slot. The depth of cut was 0.007", the feed rate was 0.005" per revolution, and the speed was 1300 surface feet per minute, typical of hard turning industry conditions. The flank wear for dry cutting was significantly higher than with LIN cooling according to the current invention. Under dry cutting conditions, the insert chipped in about 2.25 minutes of operation, whereas with LIN cooling, the insert chipped in about 4.5 minutes. The tool life was extended about 100% using cooling according to the current invention.

EXAMPLE 2

Interrupted Cutting Using Dry and Flooded PCBN and Cooled Ceramic Insert

Figure 10:
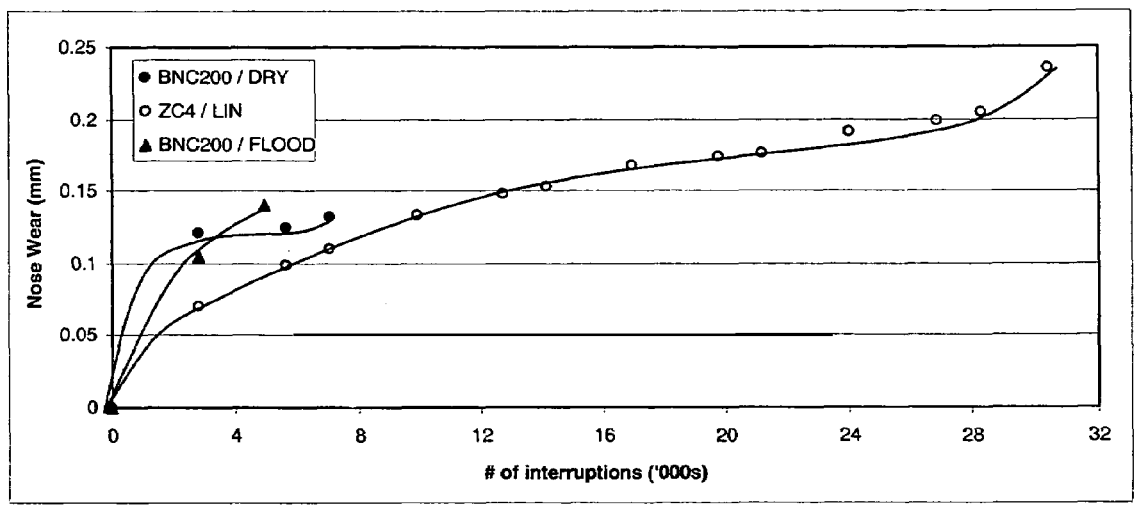

FIG. 10 presents data showing nose wear of the cutting insert versus the number of interruptions experienced for both dry and emulsion flooded cutting using a relatively expensive polycrystalline cubic boron nitride (PCBN) insert and cutting using an inexpensive alumina insert (ZC4) with LIN cooling according to the current invention. (The nose is part of the cutting insert and is indicated as 34 in FIG. 1.) PCBN inserts are generally recommended for interrupted machining operations. The depth of cut was 0.007", the feed rate was 0.005" per revolution, and the speed was 900 surface feet per minute, typical of hard turning industry conditions. The workpiece material was the same as in Example 1. The interruption in the workpiece was a 3/16" slot. The PCBN insert had a longer tool life when used dry versus flooding with an emulsion, i.e. the conventional emulsified, lubricating cutting fluid, indicating that the cooling of the edges of interruption had a negative impact on tool life. The ceramic insert cooled according to the current invention had significantly longer tool life than either PCBN/Dry and PCBN/Flood under identical cutting conditions. This test illustrated that with cooling according to the current invention, an inexpensive alumina-based ceramic insert can have a longer tool life than a PCBN insert even though the ceramic insert has a lower fracture toughness than a PCBN insert.

The invention has been described with reference to a few embodiments. Additional embodiments would be obvious to a person of ordinary skill in the art and are included in the invention as claimed.

What is claimed is:

1. A method of cutting a workpiece having interruptions, with a cutting insert, said cutting insert having a cutting edge comprising an outside surface, said cutting insert held in a tool holder, said method comprising the steps of:
    contacting said cutting edge of the insert with said workpiece;
    introducing a cryogenic coolant fluid into at least one passage near said cutting edge of the insert to indirectly cool said cutting edge and flowing said coolant fluid through a pressure drop means in said at least one passage;
    evaporating at least a portion of said coolant fluid in said at least one passage; and
    exhausting the resultant fluid from the at least one passage in a direction so that said interruptions ahead of the cutting edge are not substantially cooled by the resultant fluid, and said resultant fluid does not contact the outside surface of said cutting edge.

2. The method of claim 1, wherein said insert comprises a bottom away from said cutting edge, and during said introducing step is the step of perpendicularly impacting said bottom of said insert with said coolant.

3. The method of claim 1, wherein for said introducing step said at least one passage is located in at least one location selected from the group consisting of between the cutting insert and the tool holder, within the cutting insert, and within the tool holder.

4. The method of claim 1, wherein said tool holder further comprises a shim, and for said introducing step said at least one passage is located in at least one location selected from the group consisting of: between the cutting insert and the shim, between the shim and the tool holder, and within the shim.

5. The method of claim 1, wherein in said exhausting step said resultant fluid contains gaseous coolant and liquid coolant.

6. The method of claim 1, wherein said exhausting step directs said coolant away from said workpiece.

7. The method of claim 1, wherein said coolant fluid comprises a cryogenic liquid.

8. The method of claim 1 wherein during said flowing step said coolant fluid flows through a restriction in said at least one passage.

9. The method of claim 1 wherein the coolant fluid is at a higher pressure in the introducing step than in the exhausting step.

10. The method of claim 1 wherein said insert comprises an oxide-containing ceramic.

11. The method of claim 1 wherein said insert comprises polycrystalline cubic boron nitride (PCBN) or silicon carbide whisker-reinforced alumina ($SiC_w$-$Al_2O_3$).

* * * * *